United States Patent [19]

Baba et al.

[11] Patent Number: 4,466,655

[45] Date of Patent: Aug. 21, 1984

[54] HEADLINING ARRANGEMENT

[75] Inventors: Shigeyuki Baba; Tadayoshi Toda, both of Yokosuka, Japan

[73] Assignee: Nissan Motor Company, Limited, Japan

[21] Appl. No.: 418,989

[22] Filed: Sep. 16, 1982

[30] Foreign Application Priority Data

Sep. 24, 1981 [JP] Japan .............................. 56-149499

[51] Int. Cl.³ .............................................. B60J 7/04
[52] U.S. Cl. ........................................ 296/214; 5/406; 280/804; 296/222
[58] Field of Search ................... 296/214, 222; 5/402, 5/406, 407; 280/804

[56] References Cited

U.S. PATENT DOCUMENTS

| | | | |
|---|---|---|---|
| 1,544,874 | 7/1925 | Trimble | 5/406 |
| 2,338,309 | 1/1944 | Votypka | 296/222 |
| 2,673,599 | 3/1954 | Carsen | 5/406 |
| 3,016,263 | 1/1962 | Rehmann | 296/214 |

Primary Examiner—Robert R. Song
Attorney, Agent, or Firm—Leydig, Voit, Osann, Mayer & Holt, Ltd.

[57] ABSTRACT

A stretcher is arranged to span an intervening space between adjacent two brackets for the installation of a sliding roof frame with a view to uniformly stretching a portion of a headlining adjacent the two brackets.

2 Claims, 3 Drawing Figures

HEADLINING ARRANGEMENT

BACKGROUND OF THE INVENTION

1. Field of the Invention

The present invention relates in general to the roof triming of an automotive vehicle equipped with a sunroof and a passive seat belt and more particularly to a headlining arrangement of the kind wherein a headlining of a thin, flexible sheet material such as vinyl sheet or fabric is given a particular shape and held in a stretched state by means of a set of plural listing wires.

2. Description of the Prior Art

FIG. 1 shows a prior art headlining arrangement of the above described kind. In the drawing, designated by the reference numeral 10 is a sunroof or sliding roof frame arranged to lie beneath a vehicle roof 16 for receiving therein a sliding roof panel (not shown). To each lateral end or side of the sliding roof frame 10, a plurality of brackets 12, though only one is shown, are attached in a manner to project laterally outwardly therefrom. Though not shown, there are provided a plurality of second brackets which are secured to each roof side rail 14 in a manner to project laterally inwardly therefrom and to which the first-mentioned brackets 12 are connected for thereby stationarily supporting the sliding roof frame 10 relative to the vehicle roof 16. To each roof side rail inner 14a, a passive seat belt sliding rail 18 is secured together with a garnish 20 by means of bolt 22. A headlining 24 is secured at the peripheral part thereof to a vehicle body portion around the roof 16. For example, as shown in the drawing, the headlining 24 is in part placed at the peripheral part thereof between the roof side rail inner 14a and the passive seat belt sliding rail 18 and arranged to extend along the roof side rail inner 14a to be bonded or otherwise secured at the terminal end thereof to the roof side rail flange 14b. A welt 26 is fitted on the roof side rail flange 14b by interposing therebetween the headlining 24. Though only one is in part shown in the drawing, a set of plural listing wires 27 are provided to hang up the headlining 24 on the vehicle roof 16. By the listing wires 27, the headlining 24 is given a particular shape and held in a stretched state. Indicated by the reference numeral 28 is a roof insulator and by 30 is a limit switch for controlling the extent of movement of the sliding roof panel.

The above described prior art headlining arrangement is encountered by the drawback that the headlining 24 tends to be corrugated or wrinkled at portions adjacent the brackets 12 since with the prior art arrangement, the headlining 24 requires at the peripheral portions thereof to be placed between the roof side rail inner 14a and the passive seat belt sliding rail 18 and also to be spread over the space between the sliding roof frame 10 and the roof side rail 14 in two ways as shown by the solid lines and the phantom lines in the drawing depending upon whether the headlining 24 is associated with the bracket 12 or not. A deteriorated or coarse appearance of a passenger compartment therefore results.

SUMMARY OF THE INVENTION

In accordance with the present invention, there is provided an improved headlining arrangement which comprises a stretcher arranged to span an intervening space between adjacent two brackets for the installation of a sliding roof frame with a view to uniformly stretching a portion of a headlining adjacent the brackets.

In one embodiment, the stretcher is of a sheet material strip and in the form of having a substantially flat anchor portion attached to the lower face of the adjacent two brackets and a semi-circular sectional ridge portion extending along the laterally outward end of the anchor portion. The ridge portion is located at the laterally outward end of the adjacent two brackets and projecting downwardly therefrom while spaning the space intervening between the adjacent two brackets.

In another embodiment, the stretcher is formed from a wire and sewed to the back face of the headlining in a manner to form a projection which protrudes downwardly from the lower face of the adjacent two brackets at the laterally outward end thereof and at the same time spans the space intervening between the adjacent two brackets.

With the above structure, the headlining can be stretched uniformly, particularly at the portions intervening between the brackets, eliminating the tendency that the headlining is corrugated or wrinkled at portions adjacent the brackets.

It is accordingly an object of the present invention to provide an improved headlining arrangement which is free from the drawback noted above.

It is another object of the present invention to provide an improved headlining arrangement of the above described character which can provide a refined appearance of a passenger compartment and is particularly suited for adoption to an automotive vehicle equipped with a sliding roof and a passive seat belt.

BRIEF DESCRIPTION OF THE DRAWINGS

The features and advantages of the headlining arrangement of the present invention will become more clearly appreciated from the following description taken in conjunction with the accompanying drawings, in which like reference characters designate like or corresponding parts throughout the views thereof and wherein.

DESCRIPTION OF THE PREFERRED EMBODIMENTS

Figure 1:
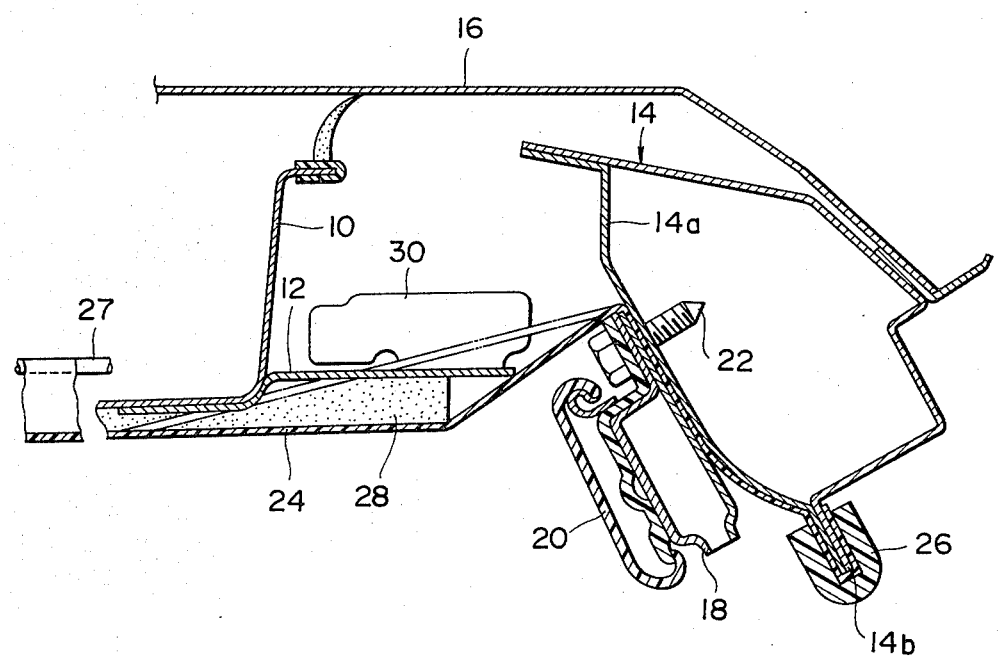
FIG. 1 is a partly cutaway sectional view of a prior art headlining arrangement of the kind wherein a set of plural listing wires are used to hang up a headlining on a vehicle roof.
Figure 2:
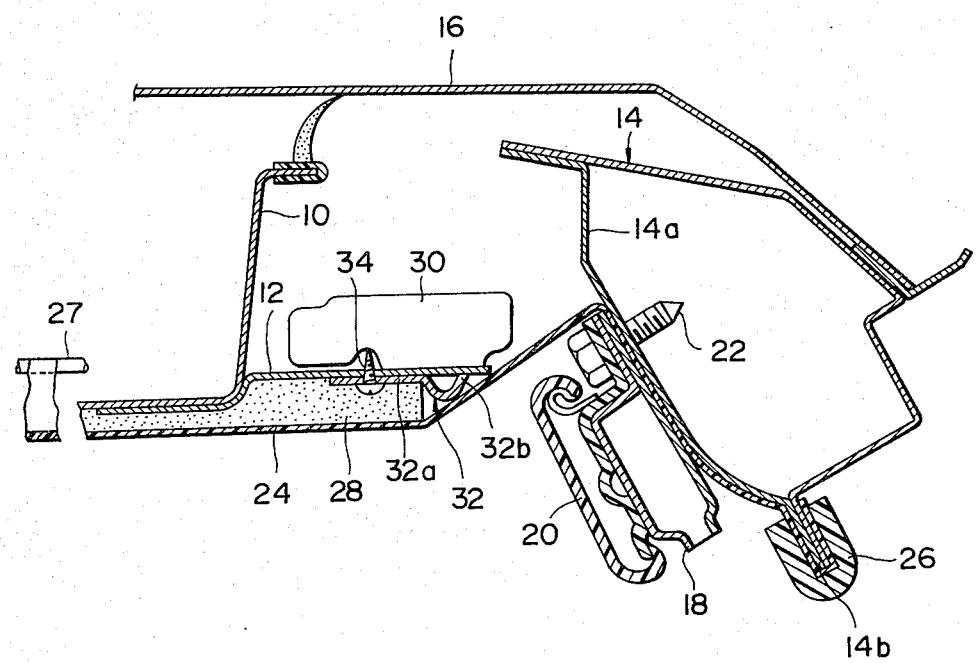
FIG. 2 is a view similar to FIG. 1 but shows a headlining arrangement according to an embodiment of the present invention.

Referring to FIG. 2, a headlining arrangement according to an embodiment of the present invention is shown to comprise a stretcher 32 which is constructed and arranged to span the intervening space between the adjacent two brackets 12. More specifically, the stretcher 12 is of a sheet material strip and in the form of having a substantially flat anchor portion 32a attached to the lower face of each bracket 12 by means of a screw 34 and a semi-circular sectional ridge portion 32b extending along the laterally outward end of the anchor portion 32a. The ridge portion 32b is located at the laterally outward ends of the brackets 12 and projects downwardly therefrom while spaning the intervening space between the brackets 12.

By the provision of the stretcher 32, the headlining 24 can be stretched uniformly, particularly at the portions intervening between the brackets 12, eliminating the tendency that the headlining 24 is corrugated or wrinkled at portions adjacent the brackets 12. Furthermore, stretcher 32 makes it possible to prevent the headlining 24 from contacting the laterally outward edge of each bracket 12, whereby the headlining 24 can be stretched more uniformly.

Figure 3:
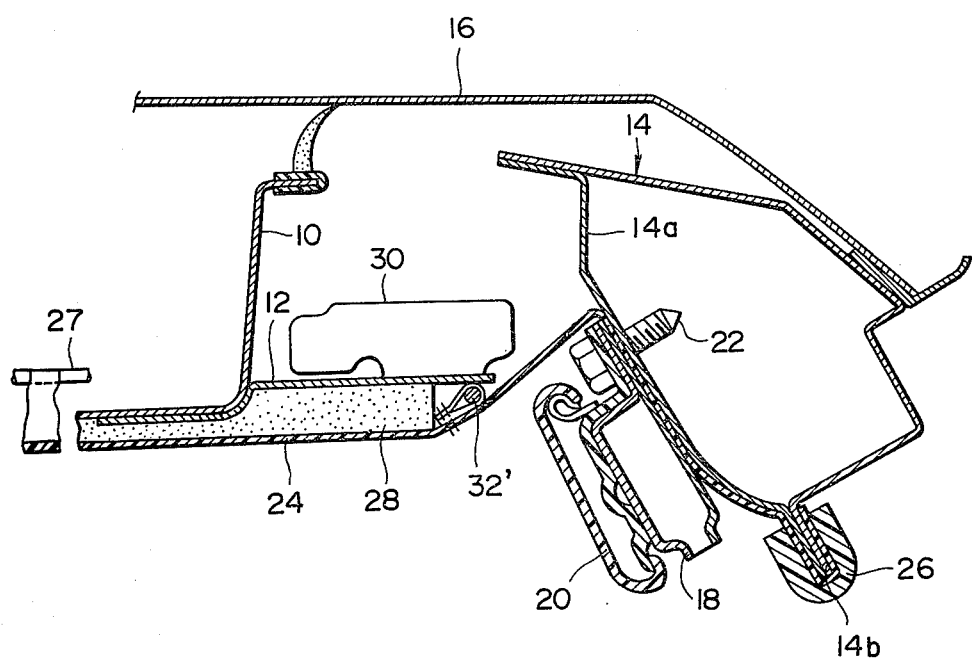
FIG. 3 is a view similar to FIG. 1 but shows a modification of the present invention.

Referring to FIG. 3, a headlining arrangement according to a modification of the present invention is shown to comprise a stretcher 32' which differs from the stretcher 32 of the previous embodiment in that it is formed from a wire and sewed to the back face of the headlining 24 in a manner to form a projection which protrudes downwardly from the lower face of the bracket 12 at the laterally outward end thereof and at the same time spans the intervening space between the adjacent two brackets 12. This embodiment can produce substantially the same effect as that of the previous embodiment.

While the stretcher 32 or 32' has been described and shown as being arranged to span the intervening space between the adjacent brackets 12, it may otherwise be so formed as to surround the sliding roof frame 10 completely.

Obviously, many variations and modifications of the present invention are possible in light of the above teachings. It is, therefore, to be understood that within the scope of the appended claims, the invention may be practiced otherwise than as specifically described.

What is claimed is:

1. In an automotive vehicle having a sliding roof frame arranged to lie beneath a vehicle roof, a plurality of brackets attached to each lateral side of the sliding roof frame for the installation of same, and a passive seat belt sliding rail attached to a roof side rail, a headlining arrangement comprising a headlining hung up in a stretched state to the vehicle body by means of a set of plural listing wires, and at least one stretcher arranged to span an intervening space between adjacent two of the brackets to uniformly stretch a portion of the headlining adjacent said two brackets, wherein said stretcher is of a sheet material strip and in the form of having a substantially flat anchor portion attached to the lower face of said two brackets and a semicircular sectional ridge portion extending along the laterally outward end of said anchor portion, said ridge portion being located at the laterally outward ends of said two brackets and projecting downwardly therefrom while spanning the space intervening between said two brackets.

2. In an automotive vehicle having a sliding roof frame arranged to lie beneath a vehicle roof, a plurality of brackets attached to each lateral side of the sliding roof frame for the installation of same, and a passive seat belt sliding rail attached to a roof side rail, a headlining arrangement comprising a headlining hung up in a stretched state to the vehicle roof by means of a set of plural listing wires, and at least one stretcher arranged to span an intervening space between adjacent two of the brackets to uniformly stretch a portion of the headlining adjacent said two brackets, wherein said stretcher is formed from a wire and sewed to the back face of the headlining in a manner to form a projection which protrudes downwardly from the lower face of said two brackets at the laterally outward end thereof and at the same time spans the space intervening between said two brackets.

* * * * *